US005134424A

United States Patent [19]

Oomori

[11] Patent Number: 5,134,424

[45] Date of Patent: Jul. 28, 1992

[54] PRINTER CONTROL APPARATUS AND METHOD

[75] Inventor: Hideyuki Oomori, Katsuta, Japan

[73] Assignee: Hitachi, Ltd., Tokyo, Japan

[21] Appl. No.: 650,415

[22] Filed: Feb. 4, 1991

[30] Foreign Application Priority Data

Feb. 8, 1990 [JP] Japan .............................. 2-27177

[51] Int. Cl.[5] .............................. G01D 15/18

[52] U.S. Cl. .............................. 346/1.1; 346/75; 346/140 R

[58] Field of Search .............................. 346/1.1, 75, 140 R

[56] References Cited

U.S. PATENT DOCUMENTS 4,768,766 9/1988 Berger et al. .............................. 346/75 X

FOREIGN PATENT DOCUMENTS 60-217178 10/1985 Japan .

61-237654 10/1986 Japan .

*Primary Examiner*—Benjamin R. Fuller

*Assistant Examiner*—Gerald E. Preston

*Attorney, Agent, or Firm*—Antonelli, Terry Stout & Kraus

[57] ABSTRACT

A printer control apparatus and method are disclosed. A printer control apparatus includes storage for storing a plurality of printing information sets, each printing information set including printing data and printing data update information indicating update characteristics of the printing data, an input device for inputting a printing information set to the printing information set storage, an update reference signal generator for supplying an update reference signal to a printing data update device, a printing data update device for updating the printing data in accordance with update information, a selector for selecting one out of the printing information sets, and a printing information generator for reading out printing data of the selected printing information set and supplying the printing data thus read out to a printer proper to execute printing. The data update device checks printing information sets stored in the storage in accordance with the update reference signal supplied from the update reference signal generator, updates printing data coming under update inclusive of printing information sets which are not being used for printing in accordance with the printing data update information, thus keeping all of the printing information sets at such a state that printing may be immediately carried out.

12 Claims, 11 Drawing Sheets

1 ROW

| | | | | | | | | | | |
|---|---|---|---|---|---|---|---|---|---|---|
| | | | | | 0 | 1 | 2 | 3 | 4 | ITEM No.01 |

2 ROWS

| | | | | | | | | | | |
|---|---|---|---|---|---|---|---|---|---|---|
| | | | | | 0 | 1 | 2 | 3 | 4 | ITEM No.01 |
| | | | | | 1 | 5 | A | B | C | ITEM No.02 |

3 ROWS

| | | | | | | | | | | |
|---|---|---|---|---|---|---|---|---|---|---|
| | | | | | 0 | 1 | 2 | 3 | 4 | ITEM No.01 |
| | | | | | 1 | 5 | A | B | C | ITEM No.02 |
| | | | | | A | B | C | D | E | ITEM No.03 |

FIG. 5C

| | | | | | | | | | | |
|---|---|---|---|---|---|---|---|---|---|---|
| | | | | | 0 | 0 | | 0 | 0 | COUNT START |
| | | | | | 2 | 9 | | 5 | 9 | COUNT END |
| | | | | | 0 | 0 | | 0 | 0 | JUMP START |
| | | | | | 2 | 3 | | 5 | 9 | JUMP END |
| | | | | | | 0 | 0 | 0 | 1 | THE NUMBER OF UPDATES |
| | | | | | | | | 0 | 1 | ITEM No. |
| | | | | | | | | | 1 | TIME COUNT PRESENCE / ABSENCE |

FIG. 6A

| | | | | | | | | | | |
|---|---|---|---|---|---|---|---|---|---|---|
| | | | | | 0 | 1 | 2 | 3 | 4 | ITEM No. 01 |
| | | | | | | | | | | ITEM No. 02 |
| | | | | | | | | | | ITEM No. 03 |

FIG. 6B

| | | | | | | | | | | |
|---|---|---|---|---|---|---|---|---|---|---|
| | | | | | 0 | 1 | 2 | 3 | 4 | ITEM No. 01 |
| | | | | | 1 | 5 | A | B | C | ITEM No. 02 |
| | | | | | | | | | | ITEM No. 03 |

FIG. 6C

| | | | | | | | | | | |
|---|---|---|---|---|---|---|---|---|---|---|
| | | | | | 0 | 1 | 2 | 3 | 4 | ITEM No. 01 |
| | | | | | 1 | 5 | A | B | C | ITEM No. 02 |
| | | | | | A | B | C | D | E | ITEM No. 03 |

PRINTER CONTROL APPARATUS AND METHOD

BACKGROUND OF THE INVENTION

The present invention relates to a printer control apparatus and method, and in particular to setting, selection and update processing of printing data of an ink jet printer control apparatus allowing change of printing contents and a method for controlling it.

With the advance of factory automation in manufacturing plants, use of ink jet printers in printing of information (such as manufacturing date, time or manufacturing lot number) onto products handled on production lines is now widespread. Since printing information can be changed diversely by means of electrical signals in ink jet printers, ink jet printers can be advantageously used as information printers of production lines for multikind and small quantity production.

In addition, printing control apparatuses as disclosed in JP-A-60-217178 and JP-A-61-237654 have been proposed in order to facilitate frequent change of printing information.

In order to conduct printing on a wide variety of products on one line, each of these printing control apparatuses has a plurality of printing information respectively associated with kinds of products and performs printing with the information associated with the kind of the product in accordance with the information.

When setting respective peculiar printing information such as manufacturing date, time or manufacturing lot number with respect to a plurality of products and selecting and using one of the printing information, however, these conventional printing control apparatuses lack consideration for keeping the printing information at the optimum state to provide for the time when information including printing information for other products which are not being used for printing are used the next time. If the product on the line is changed over, it is difficult to immediately use the printing information associated with the product after changeover.

SUMMARY OF THE INVENTION

An object of the present invention is to form beforehand printing information to be used for printing conducted by means of an ink jet printer proper into sets associated with respective products whereon printing should be conducted, store the sets of printing information into printing information set storage means, select and generate one of those sets according to the subject product of printing, thereby to facilitate adaptation to multikind and small quantity production lines, update concurrently therewith even printing data of printing information sets which are not now being used for printing in accordance with printing data update information peculiar to each printing information set, and keep these printing information sets at the optimum state so that they may be immediately used for printing at any time.

In order to achieve this object, a printer control apparatus of the present invention comprises printing information set storage means for storing a plurality of printing information sets, each printing information set including printing data indicating characters or marks to be printed and printing data update information indicating update characteristics of the above described printing data; printing information set input means for inputting printing data and printing data update information to the above described printing information set storage means; update reference signal generation means for supplying an update reference signal to printing data update means; printing data update means for updating the above described printing data in accordance with printing data update information, the above described printing data update means checking printing information sets stored in the above described printing information set storage means in accordance with the update reference signal supplied from the above described update reference signal generation means, the above described printing data update means performing update processing for updating printing data coming under update including printing information sets not being used for printing in accordance with the printing data update information; printing information set selection means for selecting one out of the printing information sets; and printing information generation means for reading out printing data of the selected printing information set and supplying the printing data thus read out to a printer proper.

Further, a printer control method of the present invention comprises the steps of inputting a plurality of printing information sets including printing data indicating characters or marks to be printed and printing data update information indicating update characteristics of the above described printing data to printing information set storage means; updating the printing data in printing data update means in accordance with update information; supplying an update reference signal to the above described printing data update means; selecting one out of the above described printing information sets; reading out printing data of the selected printing information set and supplying the printing data thus read out to a printer proper comprising an ink jet printer to conduct printing; and checking, in the above described, printing data update means, printing information sets stored in the above described printing information set storage means in accordance with the supplied update reference signal and updating printing data coming under update inclusive of printing information sets not being used for printing in accordance with the printing data update information.

The printer control apparatus of the present invention forms beforehand printing information to be used for printing conducted by means of an ink jet printer proper into sets associated with respective products whereon printing should be conducted, stores the sets of printing information into printing information set storage means, selects and generates one of those sets according to the subject product of printing, and hence facilitates adaptation to multikind and small quantity production lines. In addition, the printer control apparatus of the present invention updates even printing data of printing information sets which are not now being used for printing in accordance with printing data update information peculiar to each printing information set. Therefore, these printing information sets can be kept at the optimum state so that they may be immediately used for printing at any time.

BRIEF DESCRIPTION OF THE DRAWINGS

These and other objects and advantages of the present invention will become apparent by reference to the following description and accompanying drawings wherein:

FIGS. 3A to 6C are diagrams illustrating a printing information set in detail, wherein FIGS. 3A, 3B and 3C are configuration diagrams of dot matrices, FIGS. 4A, 4B and 4C are diagrams illustrating printing character trains, FIGS. 5A, 5B and 5C are diagrams illustrating the printing data update information storage format and printing data update information, and FIGS. 6A, 6B and 6C are diagrams illustrating printing data;

FIGS. 7 to 11 are diagrams illustrating the control processing executed by a main control section, FIG. 7 is a main processing flow chart, FIG. 8 is a flow chart showing registration processing of a printing information set, FIG. 9 is a flow chart showing selection processing of a printing information set, FIGS. 10A and 10B are flow charts showing printing processing wherein FIG. 10A shows usual printing processing whereas FIG. 10B shows an example in which printing information sets in a storage area are updated after printing processing, and FIG. 11 is a flow chart showing printing data update processing based upon a time reference signal.

DESCRIPTION OF THE PREFERRED EMBODIMENTS and method, according to the present invention will hereafter be described with reference to the drawings.

Figure 1:
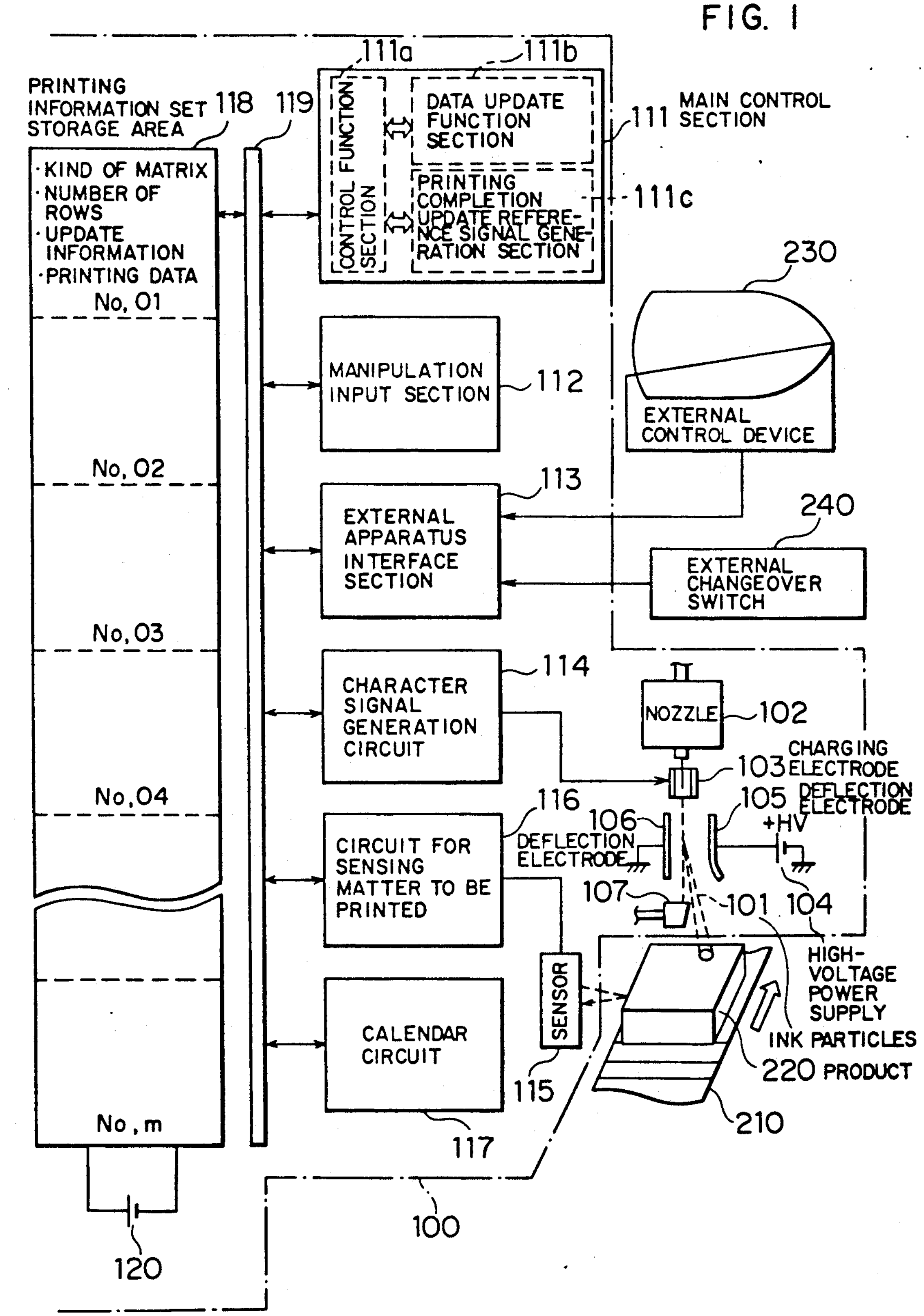
FIG. 1 is a block diagram of an information printing system for printing information on products carried on a production line.

In the embodiments, an ink jet printer is used as the printer. FIG. 1 is a block diagram of an information printing system for printing information on products conveyed on a production line.

An ink jet printer proper 100 comprises a printing head section and a control section. The printing head section comprises a nozzle 102 for jetting ink particles 101 onto a printing surface of a product 220 carried by a conveyer line 210, a charging electrode 103 for charging the ink particles jetted from the nozzle 102 by a charging signal according to a character dot pattern to be printed, deflection electrodes 105 and 106 so connected to high-voltage power supply 104 as to generate a deflection electric field and deflect the ink particles 101 flying in the deflection electric field depending on the amount of the charge, and a gutter 107 for trapping ink particles 101 which are not used for printing. The above described ink particles are deflected by the above described deflection electrodes 105 and 106 in a direction perpendicular to the direction of conveyance of products on the above described conveyer line 210. Information to be represented is printed by a dot matrix formed by the ink particles 101 which are directed to predetermined positions on a printing surface by the deflection and conveyance.

Configuration of the control section will now be described. The control section comprises a main control section 111 mainly comprised of a microcomputer and program and including a control function section 111*a* for controlling the printing operation, etc., a data update function section 111*b* for updating printing data, and a printing completion update reference signal generation function section 111*c* for generating a signal in response to completion of printing processing with respect to one product; a manipulation input section 112 including various data input switch, sections and display sections; an external apparatus interface section 113 for performing delivery and receipt of signals with an external control device 230 and an external changeover switch 240; a character signal generation circuit

114 for generating the above described charging signal depending on a character dot pattern to be printed and supplying the charging signal to the above described charging electrode 103; a circuit 116 for sensing an object to be printed which processes a signal supplied from a sensor 115 responsive to the product 220 conveyed on the above described conveyer line 210 and generates a sense signal indicating the arrival of the product 220 to be printed; a calendar circuit 117 for generating a time reference signal at intervals of one minute to generate time or date printing data; a random access memory (RAM) 118 including a printing information set storage area for storing a plurality of printing information sets by using keywords as an index, the plurality of printing information sets including printing data indicating characters or marks to be printed and printing data update information indicating update characteristics of the above described printing data; a bus line 119 for interconnecting them; and a battery 120 for maintaining the printing information sets stored in the above described RAM 118 even when power is interrupted.

Operation of the above described main control section 111 including the control function section 111*a*, the data update function section 111*b* and the printing completion update reference signal generation function section 111*c* will now be described by dividing it into operations of respective function sections.

The control function section 111*a* stores printing information sets inputted from the above described manipulation input section 112 or the external control device 230 together with keywords into the above described RAM 118 so that the printing information sets may be selectively extracted by using the keywords as the index. In accordance with a keyword inputted from the above described manipulation input section 112, the external control device 230 or the external changeover switch 240, the control function section 111*a* selects a pertinent printing information set out of the printing information set storage area of the above described RAM 118 and transfers it to a work area thereof. Whenever a sense signal is inputted from the above described circuit 116 for sensing an object to be printed, the control function section 111*a* executes printing control processing of developing the printing data into a character dot pattern via the above described character signal generation circuit 114 and supplying a charging signal to the above described charging electrode 103.

Operation of the data update function section 111*b* and the printing completion update reference signal generation function section 111*c* of the main control section will now be described.

In response to completion of the above described printing control processing of the control function section 111*a*, the update reference signal generation function section 111*c* generates a printing operation completion update reference signal. This operation will be described later by referring to flow charts shown in FIGS. 10A and 10B.

The printing operation completion update reference signal supplied from the printing completion update reference signal generation function 111*c* and/or the time reference update signal supplied from the above described calendar circuit 117 are supplied to the data update function section 111*b* via the control function section 111*a*. In response to this, the data update function section updates printing data of respective printing information sets by referring to printing data update information. This update processing will be described later in detail by referring to FIGS. 10A, 10B and 11.

Figure 2:
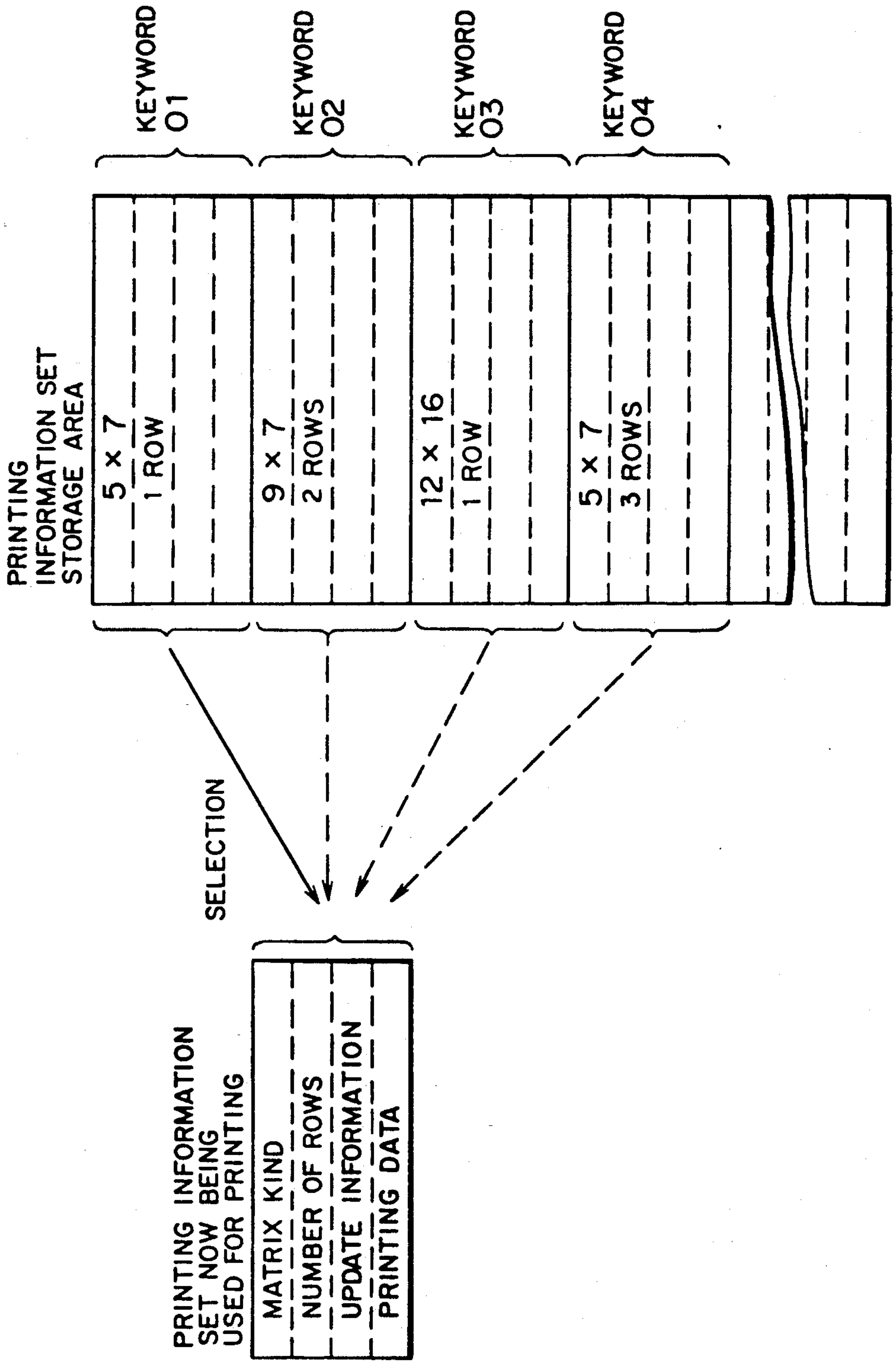
FIG. 2 is a configuration diagram of a plurality of printing information sets stored in a RAM.

FIG. 2 shows contents of a plurality of printing information sets stored in the above described RAM 118. A printing information set of this embodiment comprises dot matrix kind information (the number of dot in the matrix) for executing development processing upon a character dot pattern representing a character or a mark, information representing the number of rows of a printing character train obtained by printing the printing data, printing data update information which is update characteristics information for updating printing data, and printing data indicating characters to be printed. One of the sets can be selected and used by using a keyword as the index.

Contents of the above described printing information set will now be described concretely by referring to FIGS. 3 to 6.

Figures 3A, 3B, 3C, 4A, 4B, 4C:
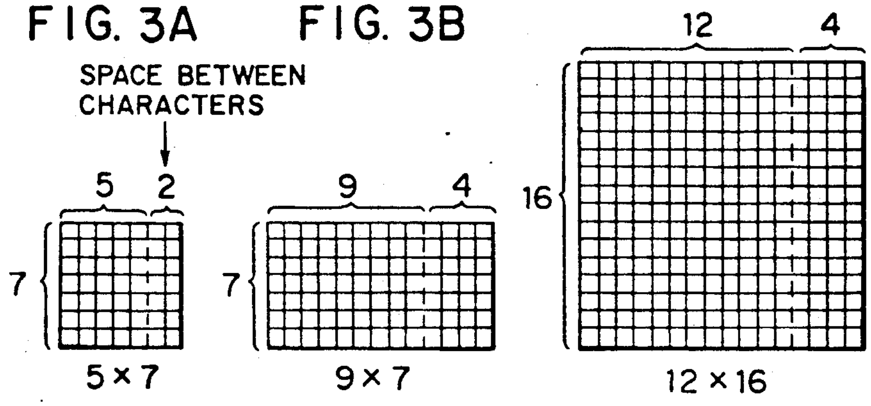

FIGS. 3A, 3B and 3C show kinds of dot matrices. In FIG. 3A, a character dot pattern occupying 7 longitudinal dots by 5 lateral dots is left-justified in a grating 7 of longitudinal dots by 7 lateral dots, and a grating of 7 longitudinal dots by 2 lateral dots is used as a space between characters. In FIG. 3B, a character dot pattern occupying 7 longitudinal dots by 9 lateral dots is left-justified in a grating of 7 longitudinal dots by 13 lateral dots and a grating of longitudinal dots by 4 lateral dots is used as the space between characters. In FIG. 3C, a character dot pattern occupying 16 longitudinal dots by 12 lateral dots is left-justified in a grating of 16 longitudinal dots by 16 lateral dots and a grating of 16 longitudinal dots by 4 lateral dots is used as the space between characters. Grating lines are shown for the purpose of description and are not actually printed.

FIGS. 4A, 4B and 4C show printing character trains. The printing character train of FIG. 4A comprises one row and the printing character train of FIG. 4B comprises two rows, whereas the printing character train of FIG. 4C comprises three rows. Each of these printing character trains is printed by one printing head section at a time. This embodiment is adapted so that characters of 10 columns may be printed every row. Frames of each row represent arrangement positions of a printing character train and are not actually printed.

Figure 5A:
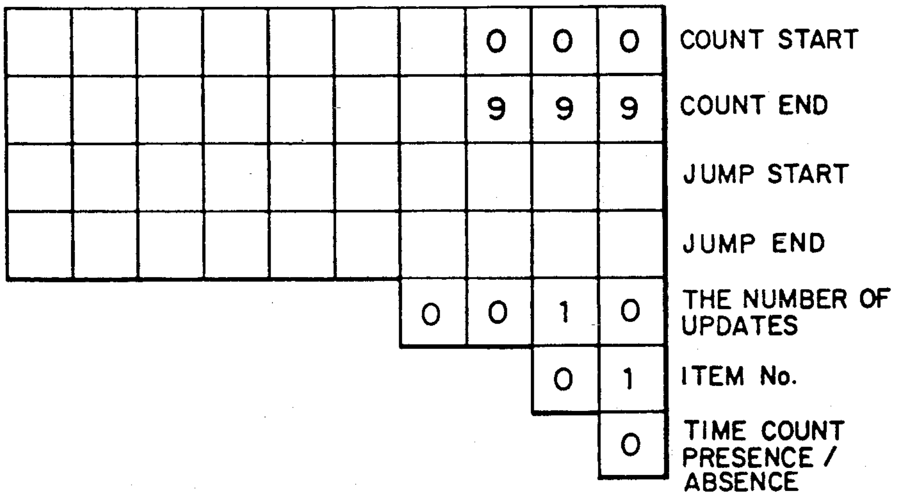
Figure 5B:
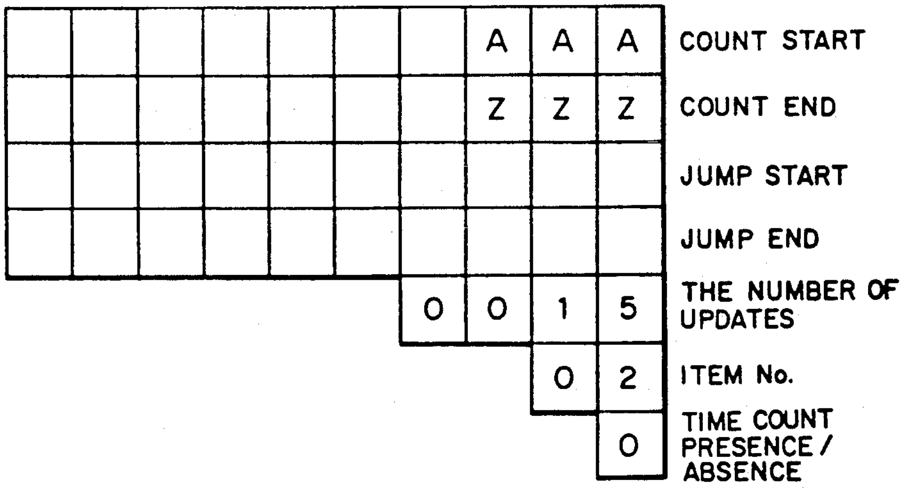

FIGS. 5A, 5B and 5C show the printing data update information storage format and printing data update information. Printing data update information is provided for printing data of each row. In this embodiment, the printing data update information comprises count start information, count end information, jump start information, jump end information, information representing the number of updates, item No. information, and time count presence/absence information.

The item No. information represents which row is to be updated in printing data by the update information.

The time count presence/absence information indicates reference information for updating printing data. In the information, "0" indicates printing data update characteristics in which the above described time reference signals are not counted but printed products are counted, whereas "1" indicates that the above described time reference signals are counted and printing data is updated.

The number of updates information is such information indicating that printing data is to be updated whenever as many time reference signals or products as is represented by the number of updates information are counted.

The count start information represents initial values of respective columns of printing data to be updated by the above described counting processing and the count end information represents their upper limit values.

The jump start information and the jump end information represents an initial value and an upper limit value to be used when updated values of the printing data are circulated or reset. When the printing data is updated and the above described upper limit value is reached, the above described initial value is then restored by the jump start information and the jump end information.

The printing data update information set in the printing data update information storage format shown in FIG. 5A has "01" as the item No. information and means update information of printing data of the first row of the printing character train. The time count presence/absence information is "0" and it is thus meant that printing data is updated by counting products. The number of updates information is "0010" and it is thus meant that reference information for updating the printing data is generated whenever 10 printed products have been counted. The count start information is "000" and the count end information is "999". When the units digit is updated up to "9", the printing data is then updated so that the tens digit may become "1" and the units digit may return to "0". When the printing data is updated up to "999", the count then returns to "0". It is shown that the printing data is updated in 3 low-order columns and 7 high-order columns are not updated.

The printing data update information set in the printing data update information storage format shown in FIG. 5B has "02" as the item No. information and means update information of printing data of the second row of the printing character train. The time count presence/absence information is "0" and it is thus meant that printing data is updated by counting products. The number of updates information is "00015" and it is thus meant that reference information for updating the printing data is generated whenever 15 printed products have been counted. The count start information is "AAA" and the count end information is "ZZZ". When the units digit is updated up to "Z", the printing data is then updated so that the tens digit may become "A" and the units digit up to "ZZZ", the count then returns to "A". It is shown that the printing data is updated in 3 low-order columns and 7 high-order columns are not updated.

The printing data update information set in the printing data update information storage format shown in FIG. 5C has "01" as the item No. information and means update information of printing data of the first row of the printing character train. The time count presence/absence information is "1" and it is thus meant that printing data is updated by counting time reference signals. The number of updates information is "0001" and it is thus meant that the printing data is updated at intervals of one minute. The count start information is "00 00" and the count end information is "29 59". In this printing data update format, "00 00" is already set as the jump start information and "23 59" is already set as the jump end information. This information indicates that arrival at "23 59" in updating the printing data from the count start toward the count end then causes return to "00 00". That is to say, this is an example of printing data update information setting for printing time at intervals of one minute in the 24-hour system.

FIGS. 6A, 6B and 6C show contents of printing data. In this embodiment, printing data of 30 columns are divided into 3 items and administered so that the printing data may be printed in three rows each comprising 10 columns. In FIG. 6A, printing data of 5 columns is already set in item No. 01. In FIG. 6B, printing data respectively comprising 5 columns are already set in item Nos. 01 and 02. In FIG. 6C, printing data respectively comprising 5 columns are already set in item Nos. 01, 02 and 03.

Setting (registration), selection and printing of printing information sets as well as update of printing data will now be described.

Figure 7:
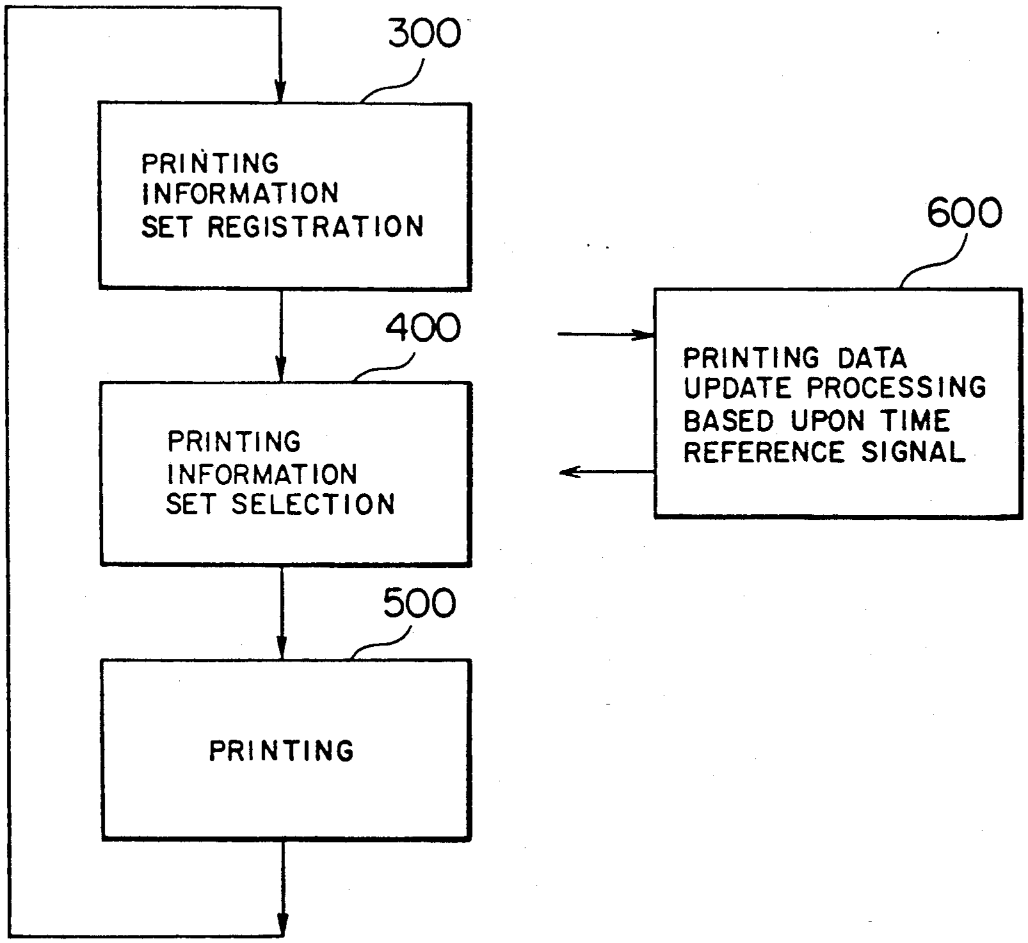

As shown in FIG. 7, the main control section 111 executes printing information set registration processing 300, printing information set selection processing 400, printing and printing data update processing 500 based upon the number of printing times, and printing data update processing 600 based upon the time reference signal. These kinds of, processing are started by input signals supplied from the above described manipulation input section 112, the external control device 230 or the external changeover switch 240, and the above described calendar circuit 117.

Figure 8:
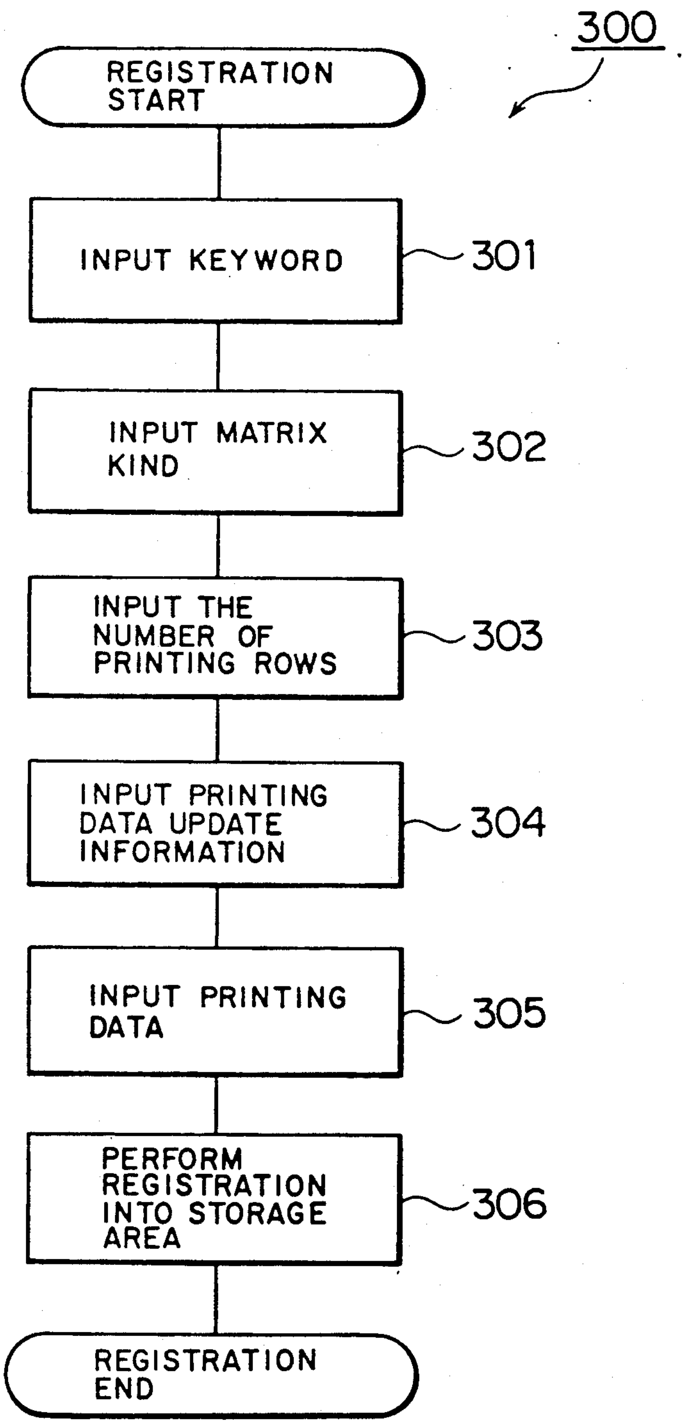

First of all, details of the printing information set registration processing 300 will now be described by referring to FIG. 8. Setting information is inputted from the manipulation input section 112 or the external control device 230. Keyword input processing 301 is first conducted. The keyword is inputted in an arbitrary form by the operator. In this embodiment, "01", "02", "03", "04", ... are used as shown in FIG. 2. Dot matrix kind input processing 302 is then conducted. Kinds (range) of usable dot matrices are limited by the character dot patterns and charging signal generation characteristics of the above described character signal generation circuit 114 and are set within a predetermined range. Processing 303 for inputting the number of printing rows is then conducted. In this embodiment, the largest number of printing rows is 3. Printing data update information input processing 304 is then conducted. As shown in FIGS. 5A to 5C, this printing data update information is set for printing data of each row. Printing data input processing 305 is then conducted. As shown in FIGS. 6A to 6C, printing data are set from row to row. Processing 306 for storing (registering) these printing information sets into the printing information set storage area of the RAM 118 is then conducted. In the embodiment of FIG. 8, registration is conducted from printing information set to printing information set. Alternatively, registration may be conducted by suitably combining a plurality of printing information sets registered beforehand. Such registration processing of printing information sets is conducted before the operation of the conveyer line during which printing is conducted by the ink jet printer so that the printing information sets already registered may be selected and used during the operation by the external changeover switch 240 or the like, resulting in improved production efficiency.

Figure 9:
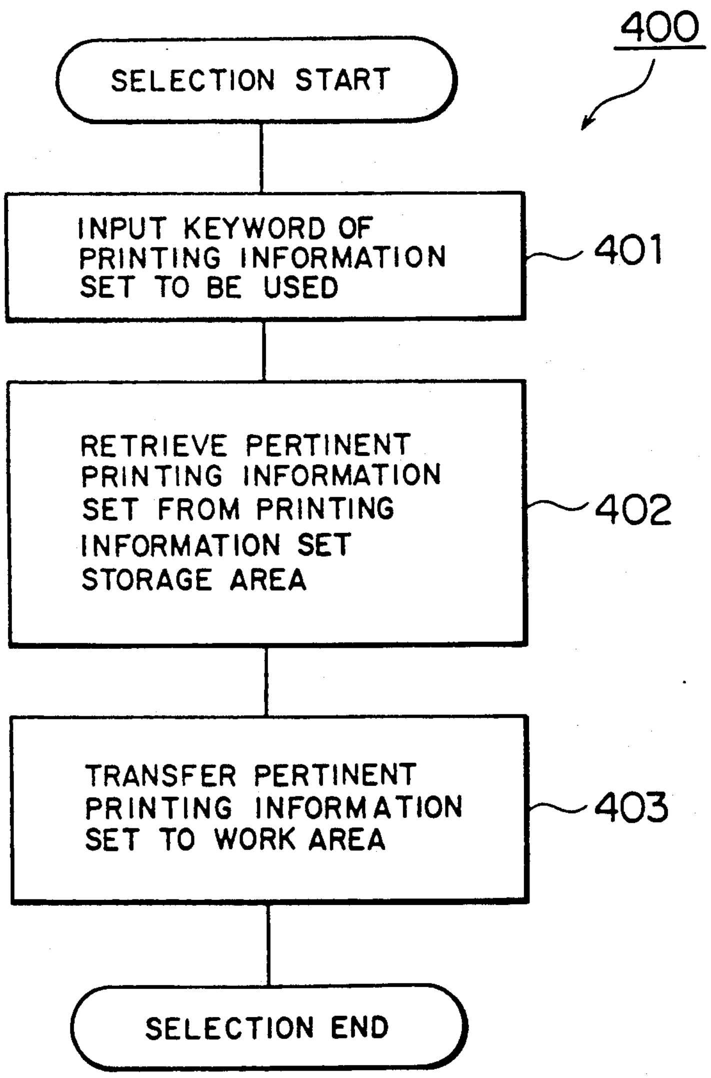

Details of the printing information set selection processing 400 will now be described by referring to FIG. 9. Selection information (keyword) inputting is conducted from the manipulation input section 112, the external control device 230 or the external changeover switch 240. First of all, input processing 401 of a keyword affixed to a printing information set to be selected is conducted. In response to this, the control function section 111*a* of the main control section performs processing 402 for retrieving a pertinent printing information set from the printing information set storage area of the RAM 118 by using the above described keyword as the index. The control function section 111*a* then transfers the pertinent printing information set to the work area of the RAM 118 and performs preparation processing 403 for printing processing.

Figure 10A:
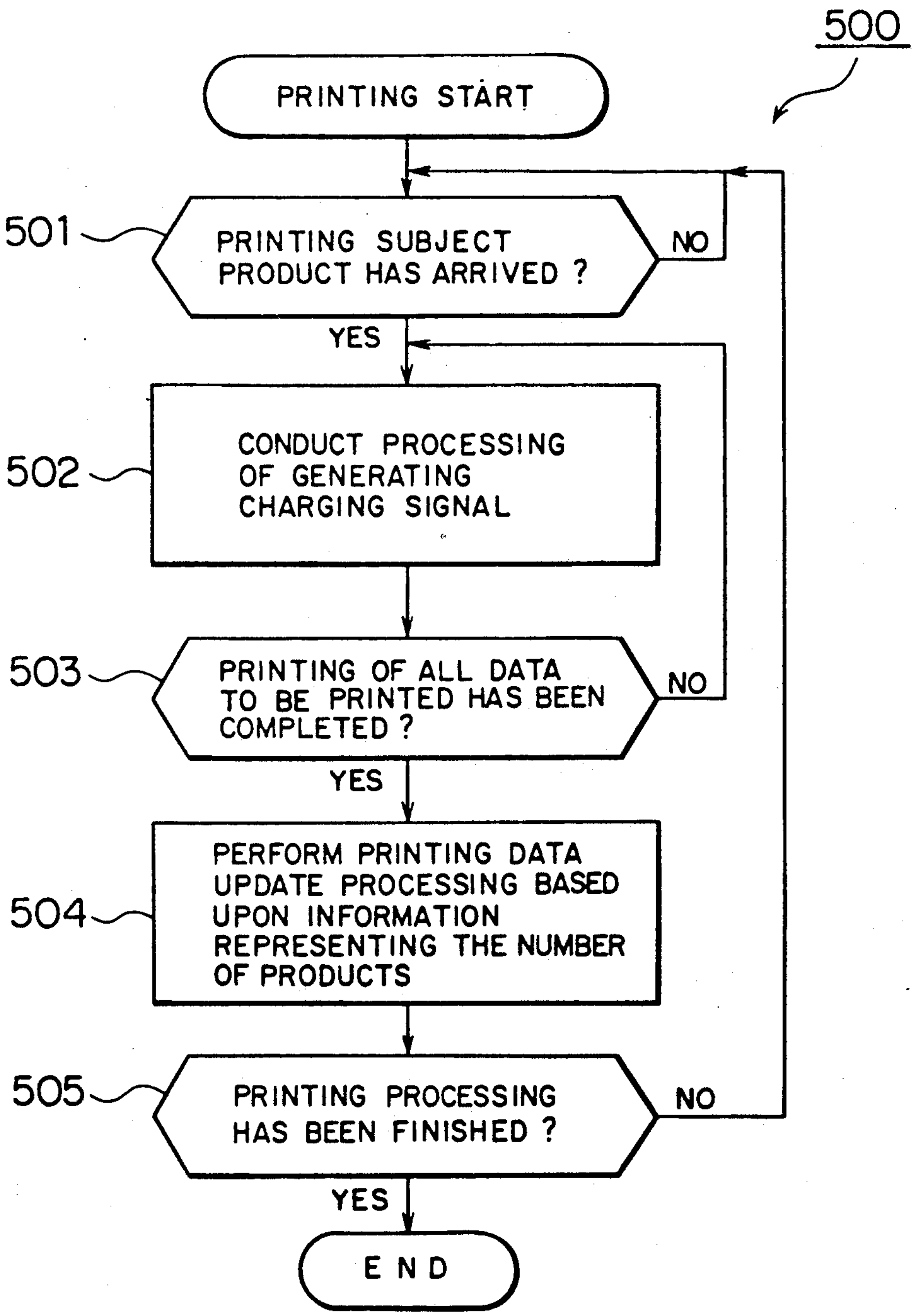
Figure 10B:
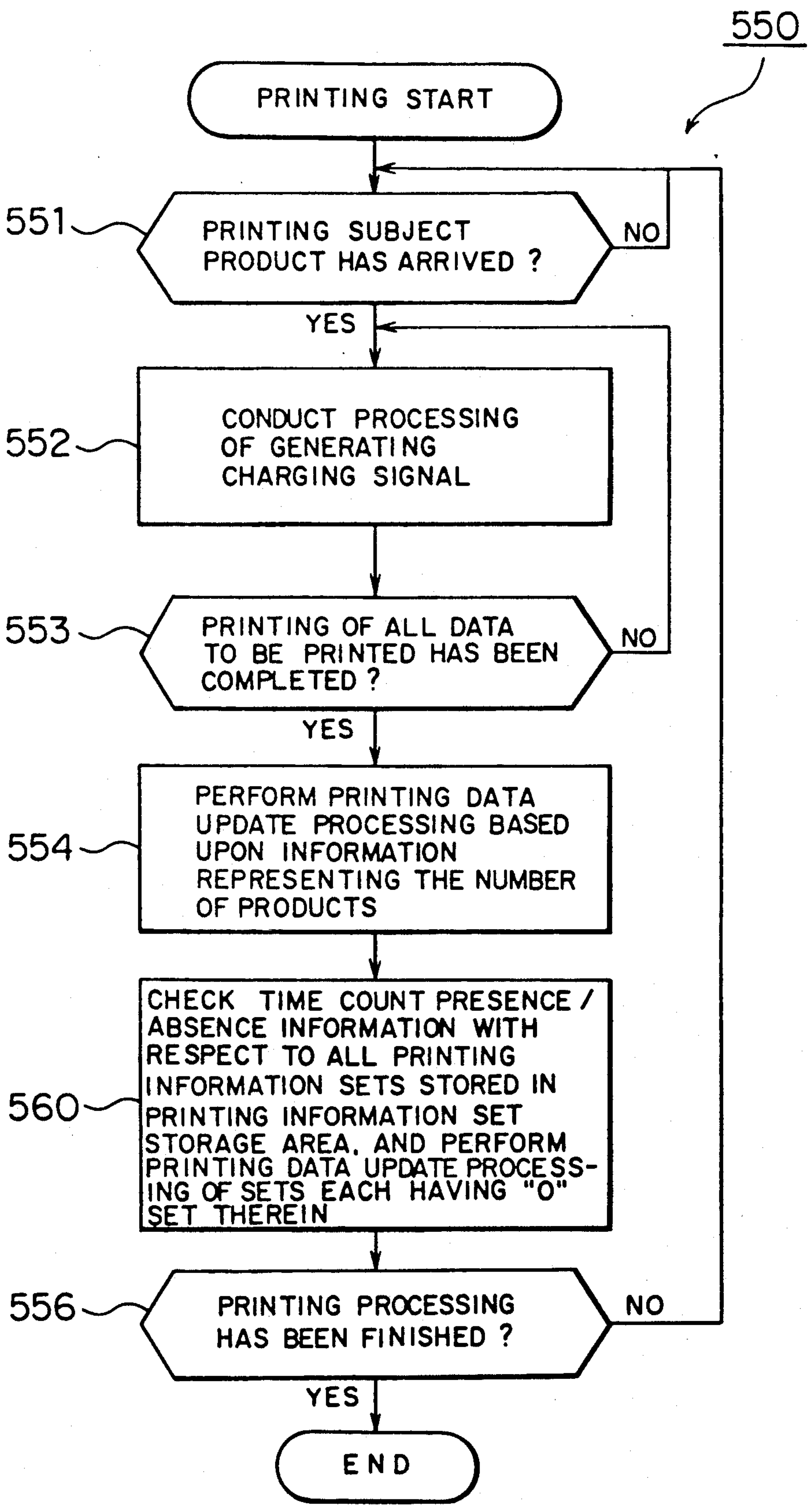

Details of the printing processing 500 will now be described by referring to flow charts shown in FIGS. 10A and 10B and the block diagram of the information printing system shown in FIG. 1. FIG. 10A shows an example of typical printing processing. FIG. 10B shows an example of processing of updating printing information sets in the printing information set storage area conducted after the processing of FIG. 10A.

First of all, the printing processing of FIG. 10A will now be described. Printing on the products 220 which are subjects of printing is performed on the basis of the sense signal supplied from the circuit 116 for sensing an object to be printed. Processing 501 of checking whether the printing subject product 220 has arrived at a position opposed to the printing head section or not is conducted. That is to say, the circuit 116 for sensing an object to be printed outputs the sense signal to the control function section 111*a* of the main control section when a printing subject product has arrived at the position of the printing head section. In response to this, the control function section performs processing of controlling the character signal generation circuit 114 by referring to the printing information set so that a charging signal according to a character dot pattern corresponding to printing data may be generated.

In succession, the control function section performs processing 503 of checking whether printing of all printing data with respect to the printing subject product 220 has been completed or not. Unless completed, the control function section returns to the processing step 502. If completed, the control function section urges the printing completion update reference signal generation section 111*c* to generate the printing operation completion update reference signal. In response to this, the signal generation section 111*c* generates the update reference signal and outputs it to the data update function section 111*b* via the control function section 111*a*. In response to this, the data update function section updates printing data of the printing information set by referring to its printing data update information (printing data update processing 504).

Further, the control function 111*a* performs processing of checking whether printing has been finished or not. It there is still a product to be printed (i.e., the result of the check processing 505 is No), processing is returned to the step 501. If there are no products, printing processing is finished. In the above described printing data update processing 504, printing data update based upon information representing the number of printed products is conducted.

An example of processing wherein printing information sets in the printing information set storage area are updated in the make of the printing processing will now be described by referring to FIG. 10B. Since processing steps 551 to 556 of FIG. 10B are nearly the same as the processing steps 501 to 506 of FIG. 10A, description will now be started from processing step 553.

Upon completion of printing on one of the products to be printed or, the update reference signal generation function section 111*c* generates the update reference signal and outputs it to the data update function section 111_b_ via the control function section 111_a_. The data update function section performs printing data update processing 554 for updating the printing data of the printing information set by referring to its printing data update information.

The control function section 111_a_ and the data update function section 111_b_ then check the time count presence/absence information of printing data update information of all printing information sets which are stored in the printing information set storage area and which are not being used for printing, and perform update processing 560 in accordance with respective preset update characteristics values with respect to printing information sets each having "0" as the time count presence/absence information. Thereafter, it is checked at step 556 whether printing processing ha been finished or not. Upon confirming completion, all processing is terminated.

Processing of FIGS. 10A and 10B is adapted to be suitably changed over by a command supplied from the external control device 230 or the like. In case manufacturing lot numbers are to be printed on different products consecutively, the update processing of FIG. 10B makes it possible to use the printing information immediately.

Figure 11:
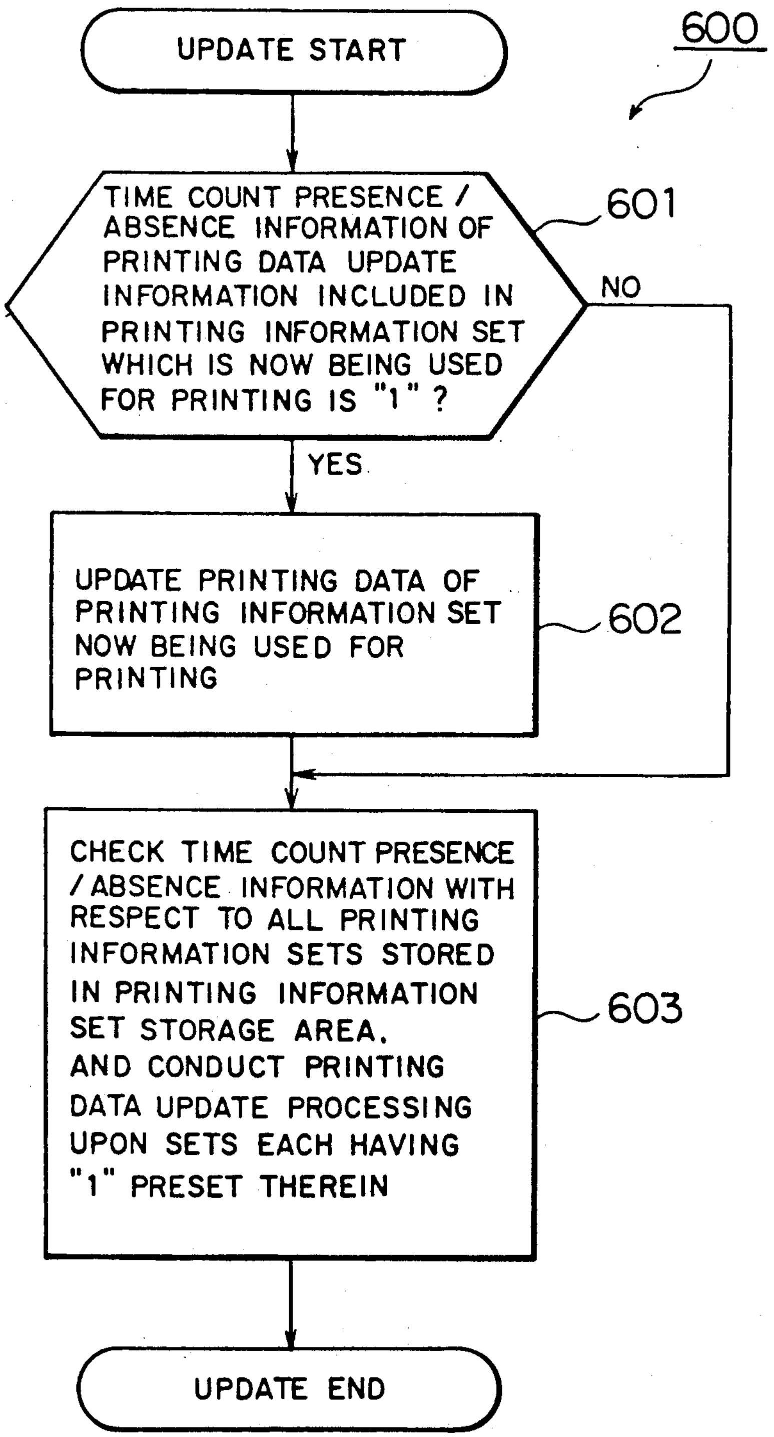

Details of the printing data update processing 600 based upon the time reference signal will now be described by referring to FIG. 11. The printing data update processing 600 is conducted as interrupt processing caused by an input signal supplied from the calendar circuit 117. When the printing data update processing is started by the time reference signal, processing 601 of checking the time count presence/absence information of printing data update information included in the printing information set which is now being used for printing is conducted. If the time count presence/absence information is "1", update processing 602 according to the update characteristics setting information is conducted. The time count presence/absence information of printing update information of all printing information sets which are stored in the printing information set storage area and which are not being used for printing is then checked. For printing information sets each having "1" preset therein, update processing 603 depending upon respective preset update characteristic values is conducted. The printing data update processing is thus finished. In this printing data update processing 600, printing data (time printing data) of printing information sets which are not being now used are also updated. Even if a new printing information set is thereafter selected and used, therefore, the time printing data of that printing information set is kept at the optimum state so that it may be immediately used. At the time of selection, time setting work is not necessary.

With reference to this embodiment, a control apparatus using an ink jet printer has been described. However, the present invention is not limited to this, but can be suitably used for a wire dot printer, a thermal transfer printer, or the like.

While particular embodiments of the present invention have been shown and described, it will be obvious to those skilled in the art that various changes and modifications may be made without departing from the present invention in its broader aspects.

I claim:

1. A printer control apparatus comprising:

printing information set storage means for storing a plurality of printing information sets, each printing information set including printing data indicating characters or marks to be printed and printing data update information indicating update characteristics of said printing data;

printing information set input means for inputting printing data and printing data update information to said printing information set storage means;

update reference signal generation means for supplying an update reference signal to printing data update means;

printing data update means for updating said printing data in accordance with said printing data update information, said printing data update means checking said printing information sets stored in said printing information set storage means in accordance with the update reference signal supplied from said update reference signal generation means, said printing data update means performing update processing for updating printing data to be updated, including printing data in printing information sets not being used for printing, in accordance with the printing data update information;

printing information set selection means for selecting one of said printing information sets; and printing information generation means for reading out the printing data of the selected printing information set and supplying the printing data thus read out to a printer.

2. A printer control apparatus according to claim 1, wherein said printer comprises an ink jet printer.

3. A printer control apparatus according to claim 1, wherein said update reference signal generation means supplies the update reference signal whenever a predetermined time has elapsed.

4. A printer control apparatus according to claim 1, wherein said update reference signal generation means supplies the update reference signal whenever a predetermined printing operation has been completed.

5. A printer control apparatus according to claim 1, wherein said printing information at storage means stores a plurality of said printing information sets using keywords as an index, and said printing information set selection means selects a printing information set on the basis of an inputted keyword.

6. A printer control apparatus according to claim 1, wherein said printing data update information comprises time count presence/absence information indicating whether said printing data are to be updated on the basis of time or said printing data are to be updated on the basis of completion of a predetermined printing operation.

7. A printer control apparatus according to claim 6, wherein said printing data update information further comprises:

row information for indicating a row to which the printing data to be updated by the update information belongs;

number of updates information for indicating a count of the update reference signal supplied from said update reference signal generation means at which the printing data is to be updated;

count start information indicating initial values of respective columns of said printing data to be updated;

count end information indicating upper limit values of respective columns of said printing data to be updated;

jump start information indicating an initial value to be used when updated values of said printing data are reset; and jump end information indicating an upper limit value to be used when updated values of said printing data are reset.

8. A printer control apparatus according to claim 6, wherein said update reference signal generation means includes time update reference signal generation mans for supplying the update reference signal whenever a predetermined time has elapsed and printing operation update reference signal generation means for supplying the update reference signal whenever a predetermined printing operation has been completed; and wherein said printing data update means checks time count presence/absence information of said printing data update information in accordance with the update reference signal supplied from said time update reference signal generation means, and performs update processing for updating printing data to be updated on the basis of time, including printing data which is not being used for printing, in accordance with the printing data update information.

9. A printer control method comprising the steps of:

inputting a plurality of printing information sets including printing data indicating characters or marks to be printed and printing data update information indicating update characteristics of said printing data to printing information set storage means;

supplying an update reference signal to printing data update means;

updating the printing data with said printing data update means in accordance with the printing data update information;

selecting one of said printing information sets;

reading out the printing data of the selected printing information set and supplying the printing data thus read out to a printer to conduct printing; and checking, with said printing data update means, the printing information sets stored in said printing information set storage means in accordance with the update reference signal and updating printing data to be updated, including printing data in printing information sets not being used for printing, in accordance with the printing data update information.

10. A printer control method according to claim 9, wherein the step of supplying the update reference signal to said printing data update means is executed whenever a predetermined time has elapsed.

11. A printer control method according to claim 9, wherein the step of supplying the update reference signal to said printing data update means is executed whenever a predetermined printing operation has been completed.

12. A printer control method according to claim 9, wherein the printer comprises an ink jet printer.

* * * * *